(12) United States Patent
Nishino

(10) Patent No.: US 11,375,147 B2
(45) Date of Patent: Jun. 28, 2022

(54) IMAGE CAPTURING ELEMENT, DRIVE METHOD, AND ELECTRONIC DEVICE HAVING IMPROVED OPERATION MODE SWITCHING

(71) Applicant: SONY SEMICONDUCTOR SOLUTIONS CORPORATION, Kanagawa (JP)

(72) Inventor: Tatsuki Nishino, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 578 days.

(21) Appl. No.: 16/325,718

(22) PCT Filed: Sep. 1, 2017

(86) PCT No.: PCT/JP2017/031591
§ 371 (c)(1),
(2) Date: Feb. 14, 2019

(87) PCT Pub. No.: WO2018/051819
PCT Pub. Date: Mar. 22, 2018

(65) Prior Publication Data
US 2021/0337119 A1    Oct. 28, 2021

(30) Foreign Application Priority Data

Sep. 15, 2016    (JP) ............................. JP2016-180501

(51) Int. Cl.
*H04N 5/376*    (2011.01)
*H04N 5/232*    (2006.01)
(Continued)

(52) U.S. Cl.
CPC ......... *H04N 5/376* (2013.01); *H04N 5/23241* (2013.01); *H04N 5/23245* (2013.01); *H04N 5/343* (2013.01); *H04N 5/3698* (2013.01)

(58) Field of Classification Search
CPC ......... H04N 5/23241; H04N 5/232411; H04N 5/23245; H04N 5/343; H04N 5/3698; H04N 5/376; H04N 5/3765
See application file for complete search history.

(56) References Cited

U.S. PATENT DOCUMENTS

2007/0188650 A1    8/2007  Kobayashi et al.
2007/0257645 A1   11/2007  Nishino
(Continued)

FOREIGN PATENT DOCUMENTS

JP         09-51485 A      2/1997
JP        09-051485 A      2/1997
(Continued)

OTHER PUBLICATIONS

International Search Report and Written Opinion of PCT Application No. PCT/JP2017/031591, dated Oct. 3, 2017, 9 pages of ISRWO.

*Primary Examiner* — Paul M Berardesca
(74) *Attorney, Agent, or Firm* — Chip Law Group

(57) ABSTRACT

The present disclosure relates to an image capturing element, a drive method, and an electronic device capable of speeding up operation mode switching. The image capturing element includes a pixel region in which a plurality of pixels is disposed in a matrix of rows and columns, and a vertical drive circuit that drives the pixels on each row. The vertical drive circuit includes a positive power source and a negative power source that supply electrical power to an output element that outputs a drive signal for driving each pixel, and a control element that controls current flowing between each wire through which electrical power is output from the (Continued)

positive power source or the negative power source and a ground level based on a pulse having a predetermined pulse width at operation mode switching. The present technology is applicable to an image capturing element having a plurality of operation modes.

8 Claims, 12 Drawing Sheets

(51) Int. Cl.
*H04N 5/343* (2011.01)
*H04N 5/369* (2011.01)

(56) References Cited

U.S. PATENT DOCUMENTS

| | | | |
|---|---|---|---|
| 2010/0231574 A1 | 9/2010 | Wakabayashi | |
| 2015/0077609 A1* | 3/2015 | Okamoto | H04N 5/3742 |
| | | | 348/303 |

FOREIGN PATENT DOCUMENTS

| | | |
|---|---|---|
| JP | 2007-221386 A | 8/2007 |
| JP | 2010-081168 A | 4/2010 |
| JP | 2010-161730 A | 7/2010 |
| WO | 2006/018923 A1 | 2/2006 |

* cited by examiner

IMAGE CAPTURING ELEMENT, DRIVE METHOD, AND ELECTRONIC DEVICE HAVING IMPROVED OPERATION MODE SWITCHING

CROSS REFERENCE TO RELATED APPLICATIONS

This application is a U.S. National Phase of International Patent Application No. PCT/JP2017/031591 filed on Sep. 1, 2017, which claims priority benefit of Japanese Patent Application No. JP 2016-180501 filed in the Japan Patent Office on Sep. 15, 2016. Each of the above-referenced applications is hereby incorporated herein by reference in its entirety.

TECHNICAL FIELD

The present disclosure relates to an image capturing element, a drive method, and an electronic device, and particularly relates to an image capturing element, a drive method, and an electronic device that are capable of speeding up operation mode switching.

BACKGROUND ART

Conventional electronic devices having an image capturing function, such as digital still cameras and digital video cameras, include solid image sensors such as charge coupled device (CCD) and complementary metal oxide semiconductor (CMOS) image sensors. Each solid image sensor includes a pixel in which a photodiode (PD) configured to perform photoelectric conversion is combined with a plurality of transistors, and produces an image on the basis of pixel signals output from a plurality of pixels disposed on an image plane on which an image of an object is formed.

Furthermore, the solid image sensor includes a positive power source and a negative power source, which are mainly achieved by such as switching power sources such as charge pumps, to drive the pixels. Necessary voltage output for the output of each switching power source is different in accordance with the operation mode of the solid image sensor in some cases, and thus output voltage needs to be linearly adjusted in a case where operation mode switching is performed.

However, in particular, a large number of switching power sources achieving low power consumption has source capacity but no sink capacity. For example, in the configuration of a power source using pulse frequency modulation for low power consumption, the source capacity is obtained on the basis of the number of switching times, and thus the output voltage is changed through lead-in of load current from a feedback side while switching is not performed in a case where a sink is needed. Thus, the output voltage statically determines in a sink operation, depending on the amount of the feedback lead-in current.

For example, Patent Document 1 discloses an image capturing element in which the level of voltage applied to a drive signal line is rapidly switched from a high level voltage to a lowest level voltage and slowly returned from the lowest level voltage to the original high level voltage through a low level voltage.

CITATION LIST

Patent Document

Patent Document 1: Japanese Patent Application Laid-Open No. 2010-81168

SUMMARY OF THE INVENTION

Problems to be Solved by the Invention

However, increase of the above-described feedback lead-in current affects low power consumption, and thus a typical power circuit achieving low power consumption is configured to reduce the lead-in current as low as possible. Thus, in such a power circuit achieving low power consumption, power for linearly decreasing voltage is insufficient with a boosting power source, and power for linearly increasing voltage is insufficient with a negative boosting power source. Accordingly, in a case where the value of output voltage necessary for mode switching or the like changes on the sink side, it is needed to wait for a long time until the output voltage statically determines after the setting thereof is switched, which results in slow operation mode switching.

The present disclosure has been made in view of such a situation, and is intended to achieve speeding up of operation mode switching.

Solutions to Problems

An image capturing element according to an aspect of the present disclosure includes a pixel region in which a plurality of pixels are disposed in a matrix of rows and columns, and a vertical drive circuit configured to drive the pixels on each row. The vertical drive circuit includes a power source configured to supply electrical power to an output element configured to output a drive signal for driving each pixel, and a control element configured to control current flowing between a wire through which electrical power is output from the power source and a ground level in accordance with a pulse having a predetermined pulse width at operation mode switching.

A drive method according to an aspect of the present disclosure is a method of driving an image capturing element including a pixel region in which a plurality of pixels are disposed in a matrix of rows and columns, and a vertical drive circuit configured to drive the pixels on each row. The method controls current flowing between a wire through which electrical power is output from a power source configured to supply electrical power to an output element configured to output a drive signal for driving each pixel and a ground level in accordance with a pulse having a predetermined pulse width at operation mode switching.

An electronic device according to an aspect of the present disclosure includes an image capturing element including a pixel region in which a plurality of pixels are disposed in a matrix of rows and columns, and a vertical drive circuit configured to drive the pixels on each row. The vertical drive circuit includes a power source configured to supply electrical power to an output element configured to output a drive signal for driving each pixel, and a control element configured to control current flowing between a wire through which electrical power is output from the power source and a ground level in accordance with a pulse having a predetermined pulse width at operation mode switching.

In an aspect of the present disclosure, current flowing between a wire through which electrical power is output from a power source configured to supply electrical power to an output element configured to output a drive signal for driving each pixel and a ground level is controlled in accordance with a pulse having a predetermined pulse width at operation mode switching.

Effects of the Invention

According to an aspect of the present disclosure, operation mode switching can be speeded up.

MODE FOR CARRYING OUT THE INVENTION

The following describes a specific embodiment to which the present technology is applied in detail with reference to the accompanying drawings.

<Exemplary Configuration of Image Capturing Element>

Figure 1:
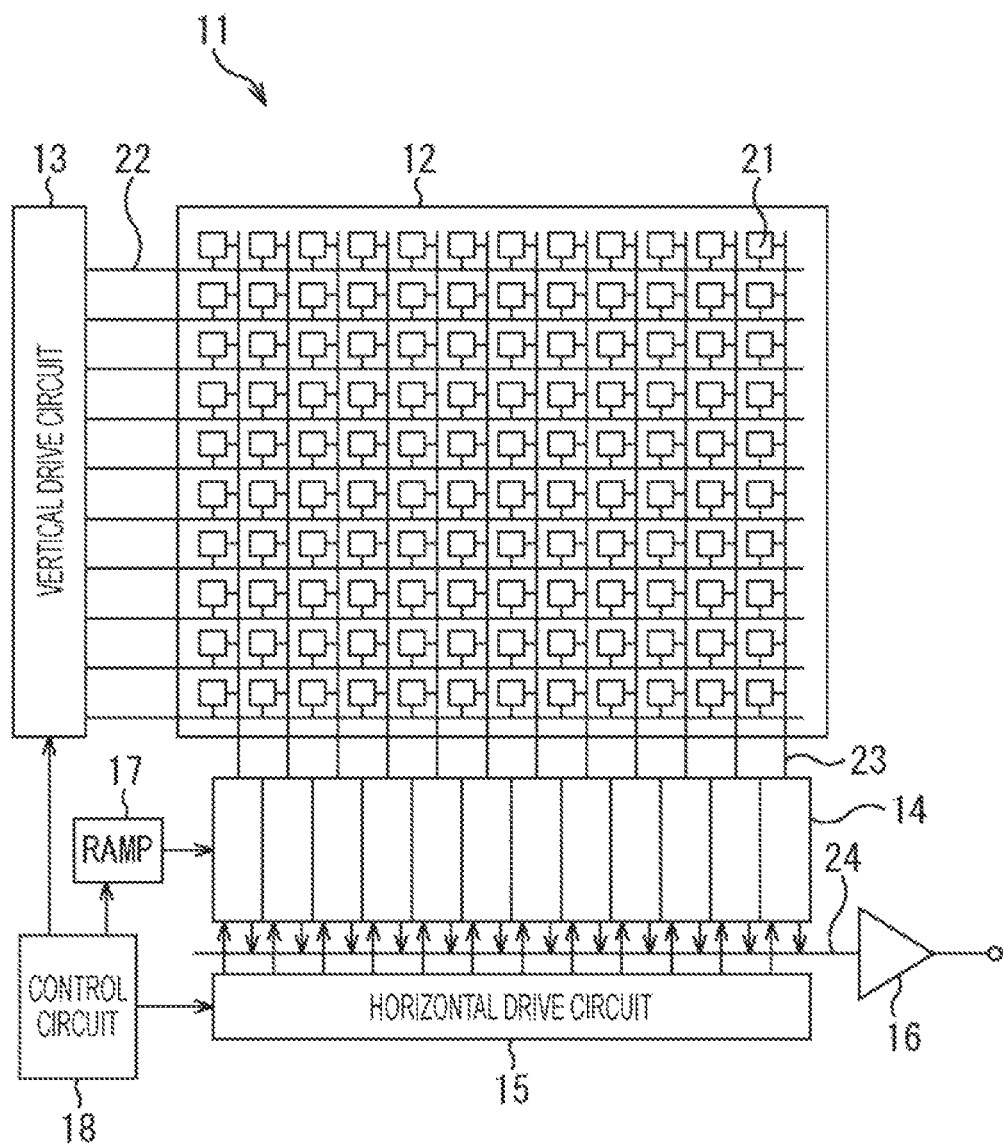
FIG. 1 is a block diagram illustrating an exemplary configuration of an embodiment of an image capturing element to which the present technology is applied.

FIG. 1 is a block diagram illustrating an exemplary configuration of an embodiment of an image capturing element to which the present technology is applied.

As illustrated in FIG. 1, an image capturing element 11 includes a pixel region 12, a vertical drive circuit 13, a column signal processing circuit 14, a horizontal drive circuit 15, an output circuit 16, a ramp signal generation circuit 17, and a control circuit 18.

The pixel region 12 is a light-receiving surface on which light condensed through an optical system (not illustrated) is received. The pixel region 12 includes a plurality of pixels 21 disposed in a matrix of rows and columns, the pixels 21 on each row are connected with the vertical drive circuit 13 through a horizontal signal line 22, and the pixels 21 on each column are connected with the column signal processing circuit 14 through a vertical signal line 23. The plurality of pixels 21 each output a pixel signal at a level in accordance with the amount of light received by the pixel, and an image of an object imaged in the pixel region 12 is established from those pixel signals.

The vertical drive circuit 13 supplies a drive signal for driving (for example, forwarding, selecting, or resetting) each pixel 21 to the pixel 21 through the horizontal signal line 22 sequentially for each row of the plurality of pixels 21 disposed in the pixel region 12.

The column signal processing circuit 14 performs correlated double sampling (CDS) processing on the pixel signals output from the plurality of pixels 21 through the vertical signal line 23 to perform analog-to-digital (AD) conversion of the pixel signals and remove reset noise.

The horizontal drive circuit 15 supplies a drive signal outputting a pixel signal from the column signal processing circuit 14 to a data output signal line 24 to the column signal processing circuit 14 sequentially for each column of the plurality of pixels 21 disposed in the pixel region 12.

The output circuit 16 amplifies the pixel signal supplied from the column signal processing circuit 14 through the data output signal line 24 at a timing in accordance with the drive signal from the horizontal drive circuit 15, and outputs the amplified pixel signal to a signal processing circuit at a later stage.

At the AD conversion of a pixel signal by the column signal processing circuit 14, the ramp signal generation circuit 17 generates a ramp signal having a waveform including a slope of a constant gradient for comparison with the potential of the vertical signal line 23, and supplies the generated ramp signal to the column signal processing circuit 14.

For example, the control circuit 18 generates and supplies a clock signal in accordance with the drive period of each block of the image capturing element 11 to control drive of the block.

<First Circuit Configuration of Image Capturing Element>

Figure 2:
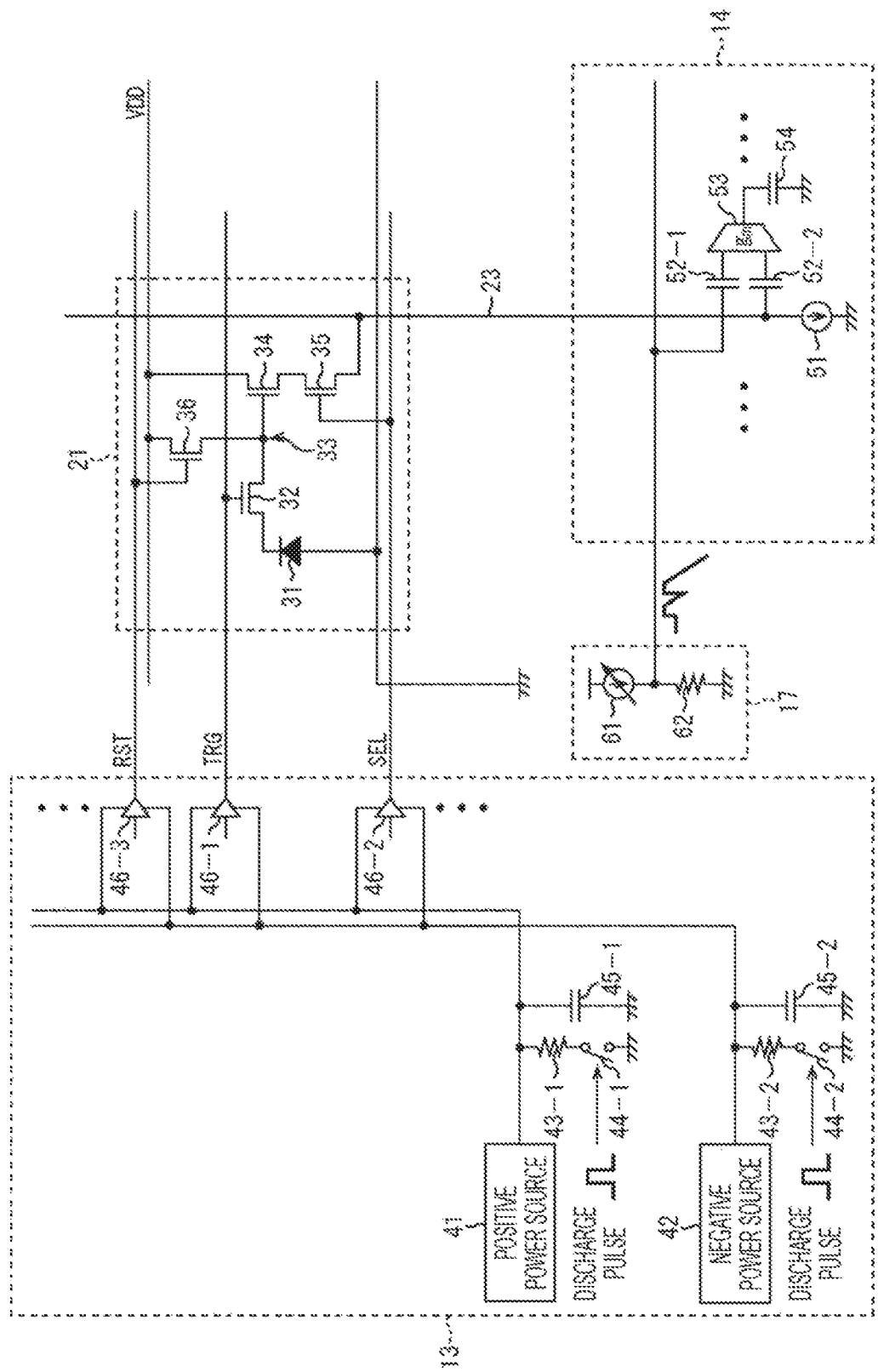
FIG. 2 is a circuit diagram illustrating a first circuit configuration of the image capturing element.

FIG. 2 is a circuit diagram illustrating a first circuit configuration of the image capturing element 11.

FIG. 2 illustrates detailed configurations of the vertical drive circuit 13, the column signal processing circuit 14, the ramp signal generation circuit 17, and each pixel 21.

The pixel 21 includes a PD 31, a forwarding transistor 32, an FD unit 33, an amplification transistor 34, a selection transistor 35, and a reset transistor 36.

The PD 31 is a photoelectrical conversion unit configured to convert incident light into electric charge through photoelectric conversion and accumulate the electric charge, and has an anode terminal grounded and a cathode terminal connected with the forwarding transistor 32.

The forwarding transistor 32 drives in accordance with a forwarding signal TRG supplied from the vertical drive circuit 13, and when the forwarding transistor 32 is turned on, electric charge accumulated at the PD 31 is forwarded to the FD unit 33.

The FD unit 33 is a floating diffusion region including a predetermined accumulation capacitor connected with the gate electrode of the amplification transistor 34, and accumulates electric charge forwarded from the PD 31.

The amplification transistor 34 outputs a pixel signal at a level (which is the potential of the FD unit 33) in accordance with electric charge accumulated at the FD unit 33 to the vertical signal line 23 through the selection transistor 35. Thus, with the configuration in which the FD unit 33 is connected with the gate electrode of the amplification transistor 34, the FD unit 33 and the amplification transistor 34 function as a conversion unit configured to convert electric charge generated at the PD 31 into a pixel signal at a level in accordance with the electric charge.

The selection transistor 35 drives in accordance with a selection signal SEL supplied from the vertical drive circuit 13, and when the selection transistor 35 is turned on, a pixel signal output from the amplification transistor 34 becomes ready to be output to the vertical signal line 23.

The reset transistor 36 drives in accordance with a reset signal RST supplied from the vertical drive circuit 13, and when the reset transistor 36 is turned on, electric charge accumulated at the FD unit 33 is discharged to a drain power source VDD to reset the FD unit 33.

The vertical drive circuit 13 includes a positive power source 41, a negative power source 42, two resistors 43-1 and 43-2, two switches 44-1 and 44-2, two capacitors 45-1 and 45-2, and three output elements 46-1 to 46-3 disposed for each row of the pixels 21.

The positive power source 41 is a power source configured to supply positive electrical power for outputting drive signals (the forwarding signal TRG, the selection signal SEL, and the reset signal RST) supplied from the vertical drive circuit 13 to each pixel 21. Similarly, the negative power source 42 is a power source configured to supply negative electrical power for outputting drive signals supplied from the vertical drive circuit 13 to each pixel 21.

The resistors 43-1 and 43-2 can restrict the amount of current in a discharge duration. The switches 44-1 and 44-2 can electrically discharge outputs of the positive power source 41 and the negative power source 42, respectively, to a ground level in accordance with discharge pulses supplied from the control circuit 18. The capacitors 45-1 and 45-2 are external capacitors of the positive power source 41 and the negative power source 42, respectively.

With a configuration in which the positive power source 41 and the ground level are connected in series with each other through the resistor 43-1 and the switch 44-1 as illustrated in the drawing, current flowing between a wire through which electrical power is output from the positive power source 41 and the ground level can be controlled in accordance with a time (pulse width) in which the switch 44-1 is turned on. Accordingly, the positive voltage of the positive power source 41 decreases. Similarly, with a configuration in which the negative power source 42 and the ground level are connected in series with each other through the resistor 43-2 and the switch 44-2, current flowing between a wire through which electrical power is output from the negative power source 42 and the ground level can be controlled in accordance with a time in which the switch 44-2 is turned on. Accordingly, the negative voltage of the negative power source 42 increases.

A time T in which the switches 44-1 and 44-2 are turned on can be calculated on the basis of the difference $\Delta V$ between a voltage value before operation mode switching of the image capturing element 11 and a voltage value desired to be set after the operation mode switching of the image capturing element 11, the resistance value R of the resistors 43-1 and 43-2, and the capacitance C of the capacitors 45-1 and 45-2. For example, the time T can be calculated on the basis of the relation of $C \times V = I \times T$ by using current I flowing through the resistors 43-1 and 43-2.

Thus, it is possible to change output voltage fast by supplying discharge pulses having the pulse width of the calculated time T to the switches 44-1 and 44-2 at a timing when a sink operation is needed upon operation mode switching of the image capturing element 11.

The output elements 46-1 to 46-3 output, to the pixel 21, drive signals at signal levels in accordance with electrical power supplied from the positive power source 41 and the negative power source 42. For example, the output element 46-1 outputs the forwarding signal TRG for driving the forwarding transistor 32, the output element 46-2 outputs the selection signal SEL for driving the selection transistor 35, and the output element 46-3 outputs the reset signal RST for driving the reset transistor 36.

The column signal processing circuit 14 includes a load metal-oxide-semiconductor (MOS) 51, two capacitors 52-1 and 52-2, a comparator 53, and a capacitor 54.

The load MOS 51 is a current source combined with the amplification transistor 34 of the pixel 21 to form a source follower.

The capacitor 52-1 connects a signal line through which the ramp signal generation circuit 17 supplies a ramp signal and one input terminal of the comparator 53, and accumulates electric charge in accordance with the level of the ramp signal. The capacitor 52-2 connects the vertical signal line 23 through which the pixel 21 outputs a pixel signal and the other input terminal of the comparator 53, and accumulates electric charge in accordance with the level of the pixel signal.

The comparator 53 compares the ramp signal and the pixel signal, and outputs a signal indicating a result of the comparison. For example, the comparator 53 outputs a signal that switches from an L level to an H level at a timing when the ramp signal becomes less than the pixel signal.

The capacitor 54 accumulates electric charge in accordance with the level of the signal output from the comparator 53.

The ramp signal generation circuit 17 includes a digital-to-analog converter (DAC) 61 and a ramp resistor 62.

The DAC 61 is a current source for generating an analog ramp signal.

The ramp resistor 62 connects the DAC 61 and the ground level.

The image capturing element 11 is configured as described above, and for example, in a case where the signal level of a drive signal output from the vertical drive circuit 13 is changed in accordance with an operation mode of the image capturing element 11, the outputs of the positive power source 41 and the negative power source 42 can be electrically discharged to the ground level in accordance with discharge pulses. Accordingly, the positive voltage output from the positive power source 41 can be rapidly decreased, and the negative voltage output from the negative power source 42 can be rapidly increased. Thus, the image capturing element 11 can change fast the signal level of the drive signal output from the vertical drive circuit 13 and reduce a time taken for change of the operation mode. Accordingly, the image capturing element 11 can speed up the operation mode switching.

<Switching Between Viewing Mode and Sensing Mode>

Figure 3:
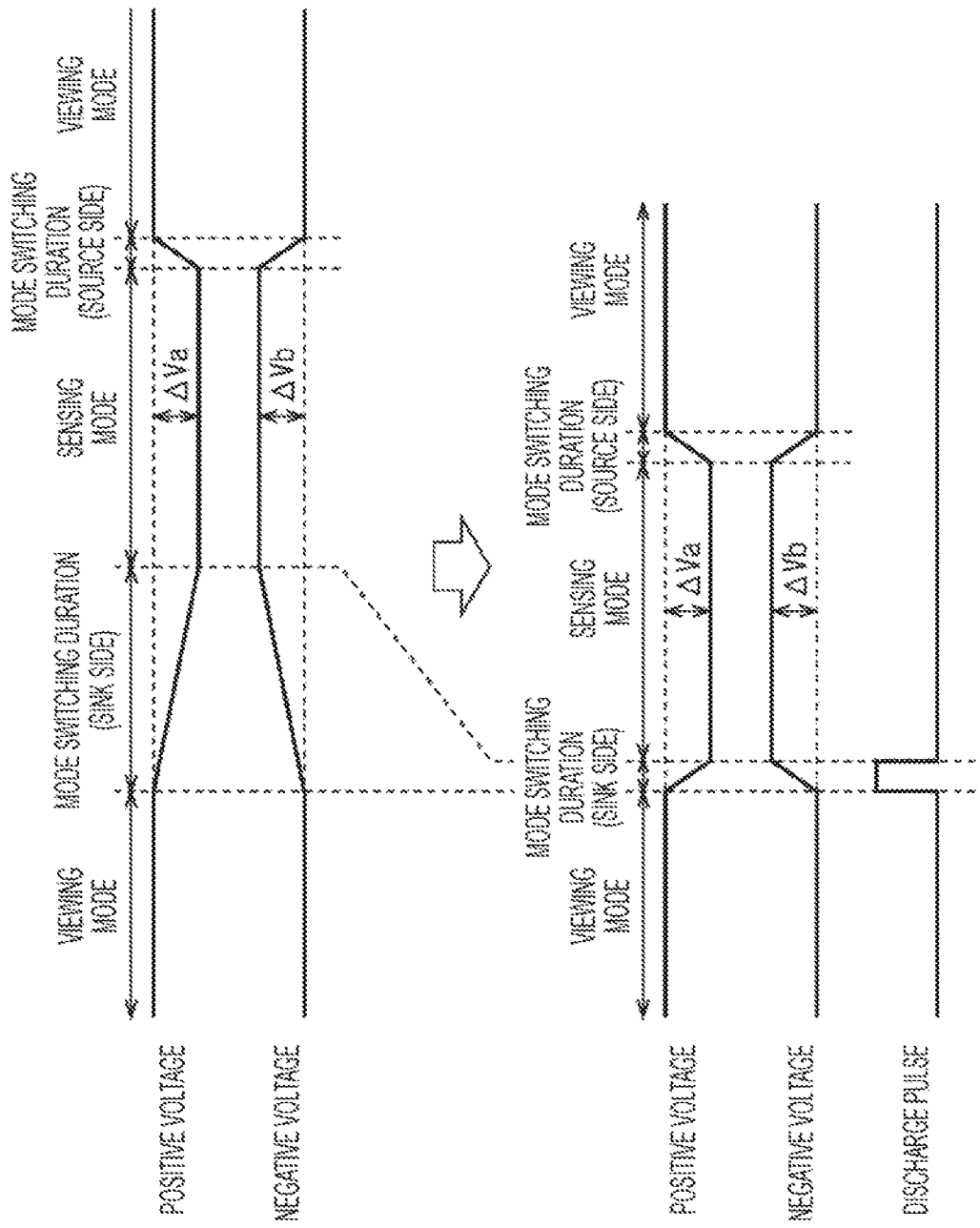
FIG. 3 is a diagram for description of switching between a viewing mode and a sensing mode.

The following describes the operation mode switching of the image capturing element 11 with reference to FIG. 3.

FIG. 3 illustrates a timing chart when the operation mode of the image capturing element 11 is switched a viewing mode and a sensing mode. FIG. 3 illustrates a timing chart of a conventional image capturing element in the upper part, and a timing chart of the image capturing element 11 in the lower part.

The viewing mode is an operation mode in which a normal image is captured by the image capturing element 11. In addition, the sensing mode is an operation mode when the image capturing element 11 is used as a moving body detection sensor or the like. For example, in the viewing mode, the image capturing element 11 needs to set a large voltage difference between the positive voltage and the negative voltage to capture a high-definition image. However, in the sensing mode, the image capturing element 11 may set a small voltage difference between the positive voltage and the negative voltage to capture an image having a resolution low enough to achieve the functionality of a sensor.

Thus, when the operation mode is to be switched from the viewing mode to the sensing mode, the image capturing element 11 needs to decrease the output of the positive power source 41 by a voltage difference $\Delta Va$ and increase the output of the negative power source 42 by a voltage difference $\Delta Vb$.

In the conventional image capturing element, as described above, power for linearly decreasing voltage is insufficient with a boosting power source, and power for increasing voltage is insufficient with a negative boosting power source. Thus, in a case where the value of output voltage necessary for the operation mode switching or the like changes on the sink side as illustrated in the upper part of FIG. 3, it is needed to wait for a long time until the output voltage statically determines after the setting thereof is switched.

However, the image capturing element 11 can control current flowing between the ground level and each of the positive power source 41 and the negative power source 42 by turning on the switches 44-1 and 44-2 in accordance with discharge pulses having pulse widths as described above. Accordingly, as illustrated in the lower part of FIG. 3, it is possible to decrease the output of the positive power source 41 by the voltage difference $\Delta Va$ and increase the output of the negative power source 42 by the voltage difference $\Delta Vb$ in a short time. Thus, it is possible to reduce a time taken until the voltage of a drive signal output from the vertical drive circuit 13 statically determines, and the image capturing element 11 can perform fast the switching from the viewing mode to the sensing mode.

<Second Circuit Configuration of Image Capturing Element>

Figure 4:
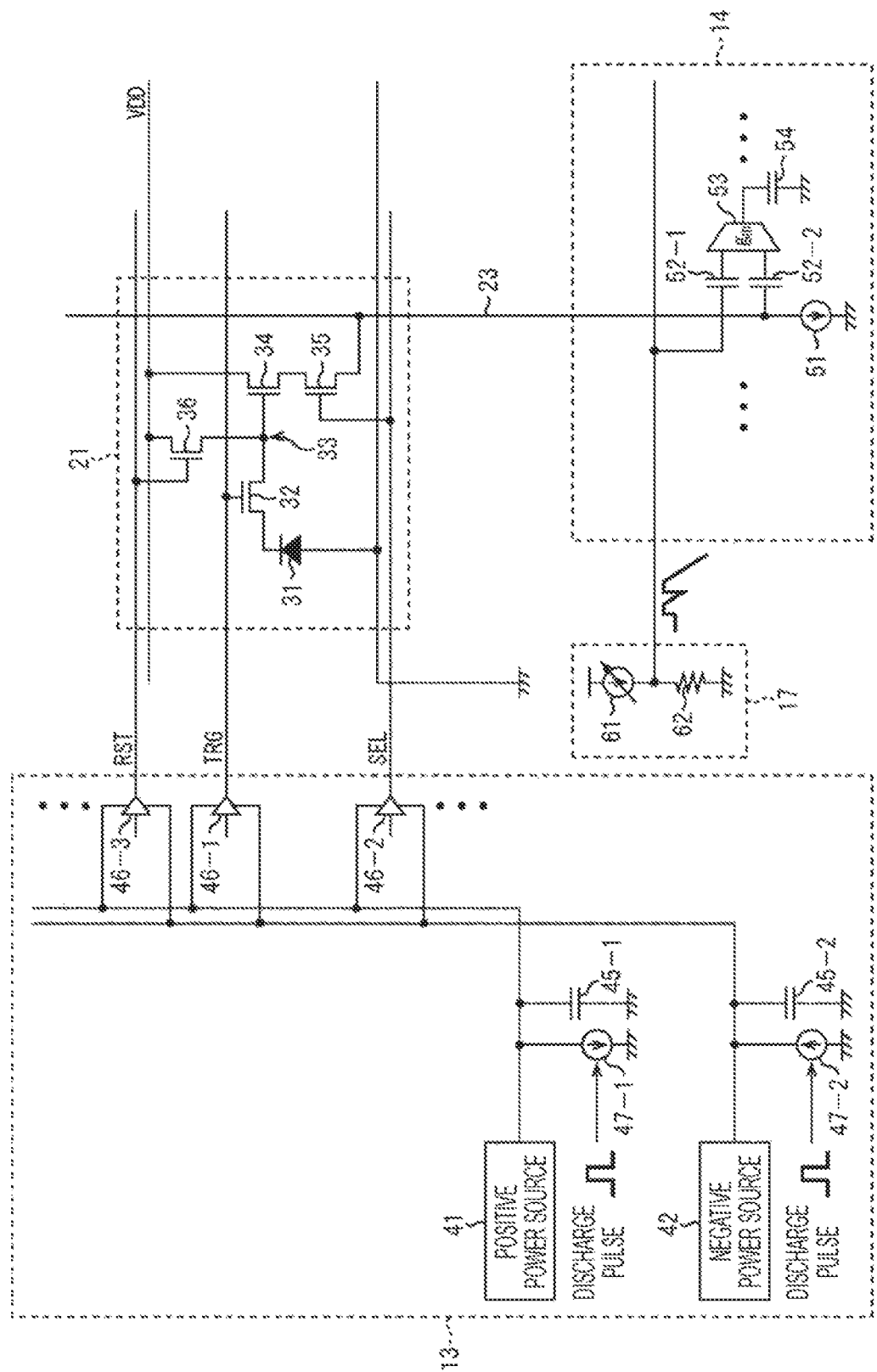
FIG. 4 is a circuit diagram illustrating a second circuit configuration of the image capturing element.

FIG. 4 is a circuit diagram illustrating a second circuit configuration of the image capturing element 11. Note that any component of the circuit configuration illustrated in FIG. 4 identical to that of the circuit configuration illustrated in FIG. 2 is denoted by an identical reference sign, and detailed description thereof is omitted.

In the circuit configuration illustrated in FIG. 4, a current source 47-1 is provided in place of the resistor 43-1 and the switch 44-1 in FIG. 2, and a current source 47-2 is provided in place of the resistor 43-2 and the switch 44-2 in FIG. 2. Specifically, the current source 47-1 connects the wire through which electrical power is output from the positive power source 41 and the ground level in series, and the current source 47-2 connects the wire through which electrical power is output from the negative power source 42 and the ground level in series.

The current sources 47-1 and 47-2 can each output constant current between the output of the positive power source 41 or the negative power source 42 and the ground level in accordance with a discharge pulse supplied from the control circuit 18. With this circuit configuration, discharge is performed at a constant gradient in accordance with the constant current values of the current sources 47-1 and 47-2, and the output voltages of the positive power source 41 and the negative power source 42 change.

Thus, in the circuit configuration including the current sources 47-1 and 47-2, too, it is possible to decrease the output of the positive power source 41 by the voltage difference $\Delta Va$ and increase the output of the negative power source 42 by the voltage difference $\Delta Vb$ in a short time as described above with reference to FIG. 3. Accordingly, the operation mode switching of the image capturing element 11 can be speeded up.

<Third Circuit Configuration of Image Capturing Element>

Figure 5:
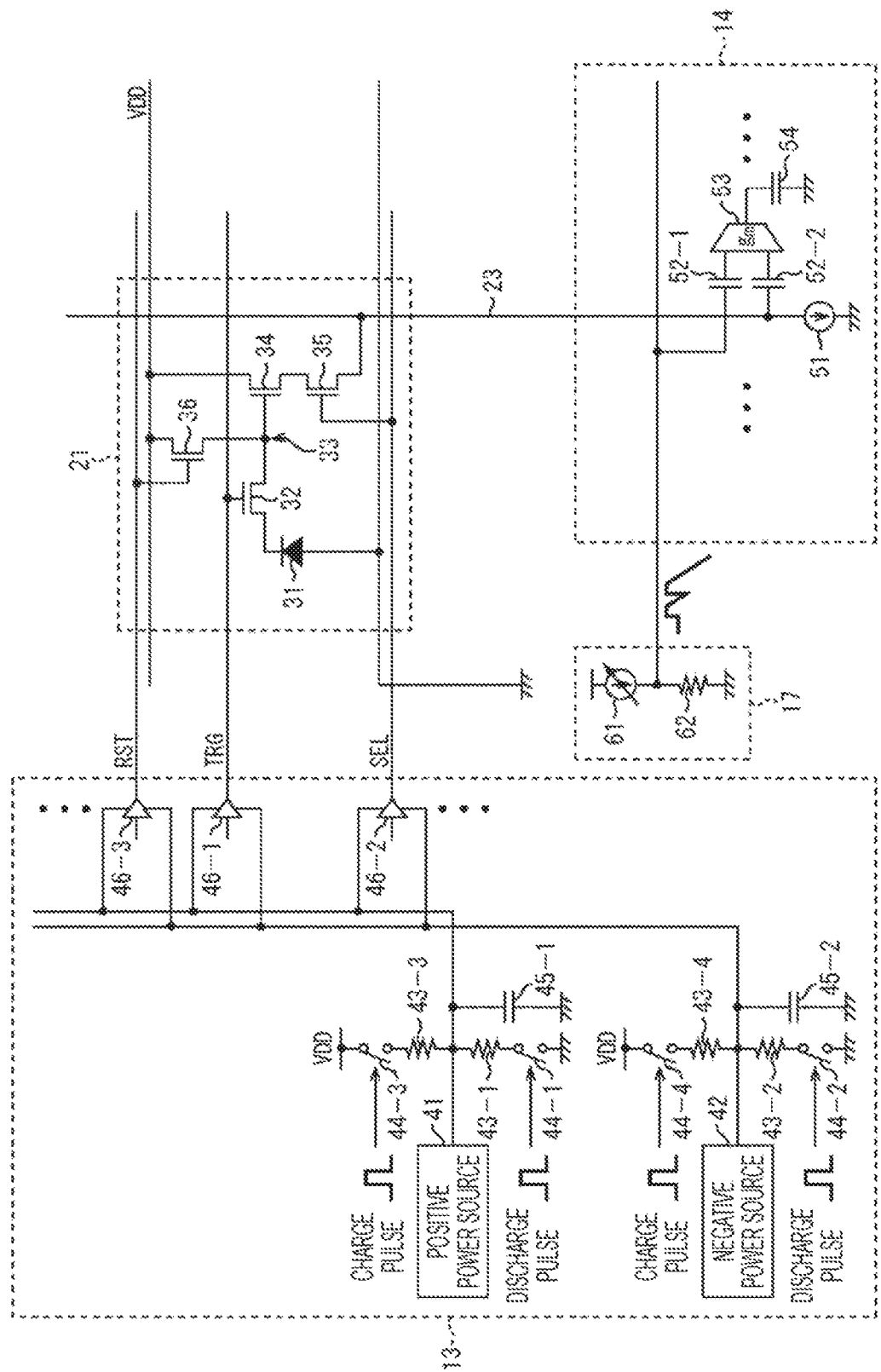
FIG. 5 is a circuit diagram illustrating a third circuit configuration of the image capturing element.

FIG. 5 is a circuit diagram illustrating a third circuit configuration of the image capturing element 11. Note that any component of the circuit configuration illustrated in FIG. 5 identical to that of the circuit configuration illustrated in FIG. 2 is denoted by an identical reference sign, and detailed description thereof is omitted.

In the circuit configuration illustrated in FIG. 5, resistors 43-3 and 43-4 and switches 44-3 and 44-4 are provided in addition to the circuit configuration in FIG. 2.

As illustrated in the drawing, the resistor 43-3 and the switch 44-3 connect the positive power source 41 and the power source VDD in series, and the switch 44-3 charges the output of the positive power source 41 through the power source VDD in accordance with a charge pulse. Similarly, the resistor 43-4 and the switch 44-4 connect the negative power source 42 and the power source VDD in series, and the switch 44-4 charges the output of the negative power source 42 through the power source VDD in accordance with a charge pulse.

With this circuit configuration, response faster than that in a conventional case can be achieved in a source operation by turning on the charge pulse. In addition, in a case where the voltage of the positive power source 41 is increased to be higher that of the power source VDD, a time in which output changes at least up to the power source VDD can be reduced by turning on the charge pulse.

Thus, in a case where a pixel drive power source is achieved by, for example, a charge pump in the conventional image capturing element, electric charge supply capacity in the source operation is determined by the size of Fly Cap of the charge pump and a switching frequency. Accordingly, conventionally, the speed of instantaneous response has been limited in terms of size and electrical power.

However, in the image capturing element 11 with the circuit configuration illustrated in FIG. 5, the outputs of the positive power source 41 and the negative power source 42 can be responded in a short time in the source operation. Accordingly, the operation mode switching of the image capturing element 11 can be speeded up.

In addition, with such a circuit configuration, for example, voltage change between a plurality of operation modes can be responded at high speed through control by using a discharge pulse and a charge pulse, and start or stop of the operation of the image capturing element 11 can be speeded up.

<Switching Between a Plurality of Operation Modes>

Figure 6:
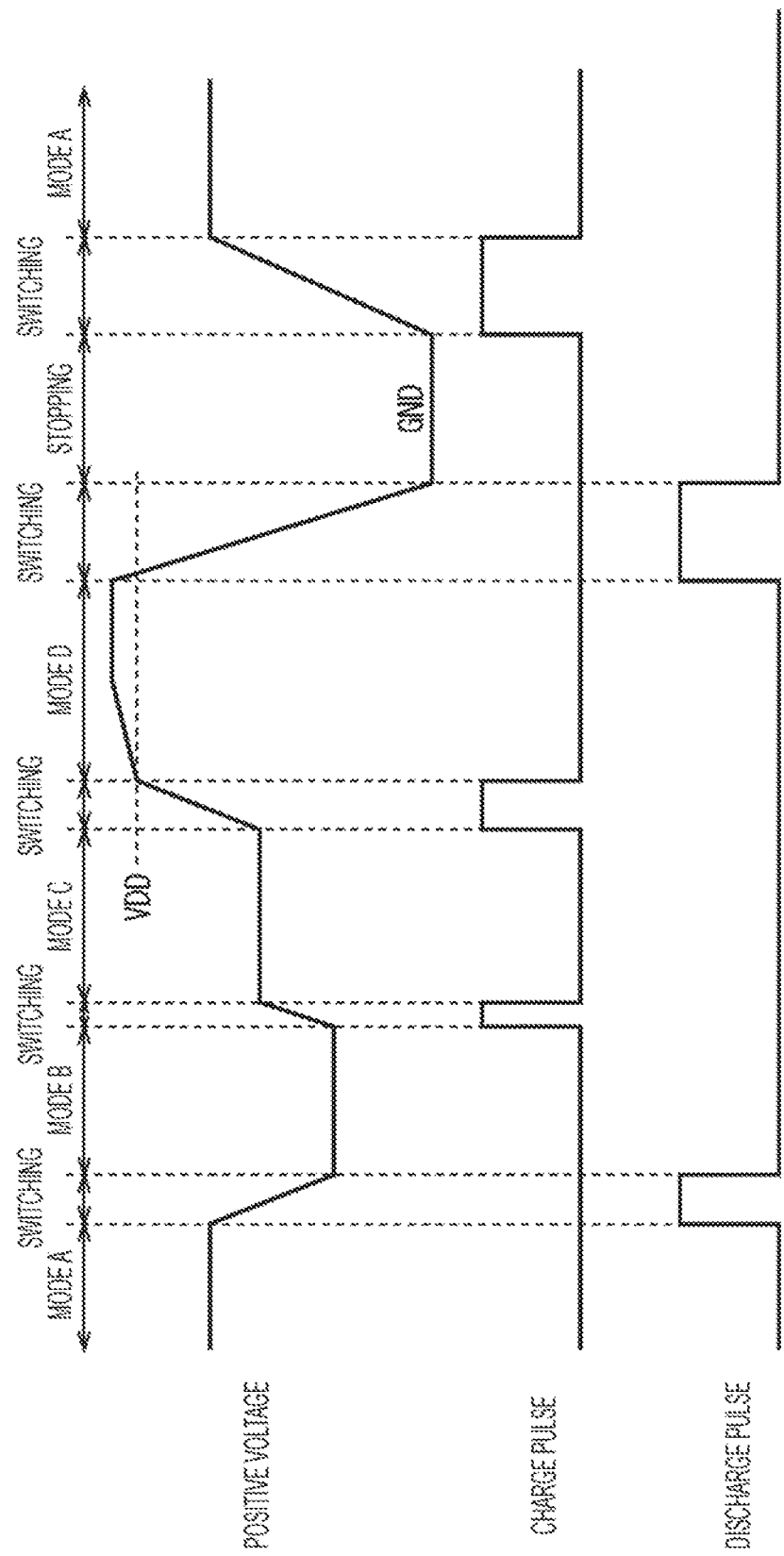
FIG. 6 is a diagram for description of operation mode switching.

The following describes switching between a plurality of operation modes at the image capturing element 11 with reference to FIG. 6.

FIG. 6 illustrates a timing chart of the output of the positive power source 41 when the operation mode of the image capturing element 11 having the circuit configuration illustrated in FIG. 5 is switched in the order of a mode A, a mode B, a mode C, stopping, and the mode A.

As illustrated in the drawing, in a case where the positive voltage in the mode B is lower than the positive voltage in the mode A, a discharge pulse is supplied to the switch 44-1 in a mode switching duration. Accordingly, the positive voltage decreases in accordance with a discharge duration in which the switch 44-1 is turned on in response to the discharge pulse.

In addition, in a case where the positive voltage in the mode C is higher than the positive voltage in the mode B, a charge pulse is supplied to the switch 44-3 in a mode switching duration. Accordingly, the positive voltage increases in accordance with a charge duration in which the switch 44-3 is turned on in response to the charge pulse.

Then, in a case where the positive voltage in the mode D is higher than the positive voltage in the mode C and the positive voltage in the mode D is equal to or higher than the power source VDD, a charge pulse is supplied to the switch 44-3 in a mode switching duration. Accordingly, the positive voltage increases in accordance with a charge duration in which the switch 44-3 is turned on in response to the charge pulse, and thereafter increases up to the positive voltage in the mode D in accordance with the charge pump capacity of the positive power source 41.

Thereafter, when the mode D is switched to stopping, a discharge pulse is supplied to the switch 44-1 until the switch becomes the ground level (GND). Accordingly, the positive voltage decreases in accordance with a discharge duration in which the switch 44-1 is turned on in response to the discharge pulse.

Then, when the stopping is switched to the mode A through activation, a charge pulse is supplied to the switch 44-3 in a mode switching duration. Accordingly, the positive voltage increases in accordance with a charge duration in which the switch 44-3 is turned on in response to the charge pulse.

Note that the pulse width of a charge pulse or a discharge pulse in each mode switching duration is determined by a set voltage before and after mode switching, and thus this information and a timing can be set in advance to allow the image capturing element 11 to control fast the mode switching.

Note that the image capturing element 11 as described above is applicable to various electronic devices of, for example, an image pickup system such as a digital still camera or a digital video camera, a cellular phone having an image capturing function, and another instrument having an image capturing function.

<Exemplary Configuration of Image Capturing Apparatus>

Figure 7:
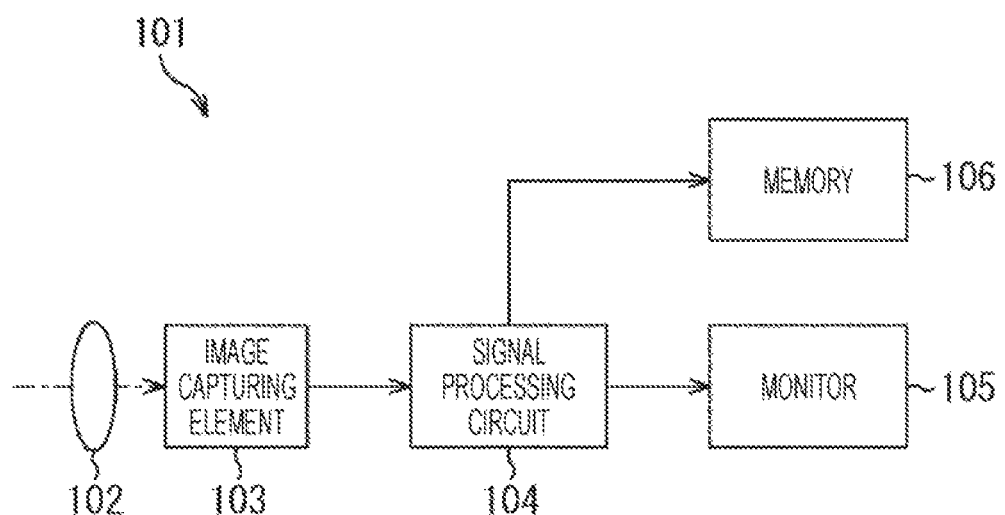
FIG. 7 is a block diagram illustrating an exemplary configuration of an image capturing apparatus.

FIG. 7 is a block diagram illustrating an exemplary configuration of an image capturing apparatus mounted on an electronic device.

As illustrated in FIG. 7, an image capturing apparatus 101 includes an optical system 102, an image capturing element 103, a signal processing circuit 104, a monitor 105, and a memory 106, and is capable of capturing still images and moving images.

The optical system 102 includes one or a plurality of lenses, and guides image light (incident light) from an object to the image capturing element 103 to image the light onto a light-receiving surface (sensor unit) of the image capturing element 103.

The image capturing element 11 described above is applied as the image capturing element 103. The image capturing element 103 accumulates electrons for a constant duration in accordance with an image formed on the light-receiving surface through the optical system 102. Then, a signal in accordance with the electrons accumulated at the image capturing element 103 is supplied to the signal processing circuit 104.

The signal processing circuit 104 performs various kinds of signal processing on this pixel signal output from the image capturing element 103. An image (image data) obtained through the signal processing performed by the signal processing circuit 104 is supplied to and displayed on the monitor 105, or supplied to and stored (recorded) in the memory 106.

In the image capturing apparatus 101 thus configured, since the image capturing element 11 described above is applied, for example, the operation mode can be switched at a faster speed to capture images in various operation modes.

Use Examples of Image Sensor

Figure 8:
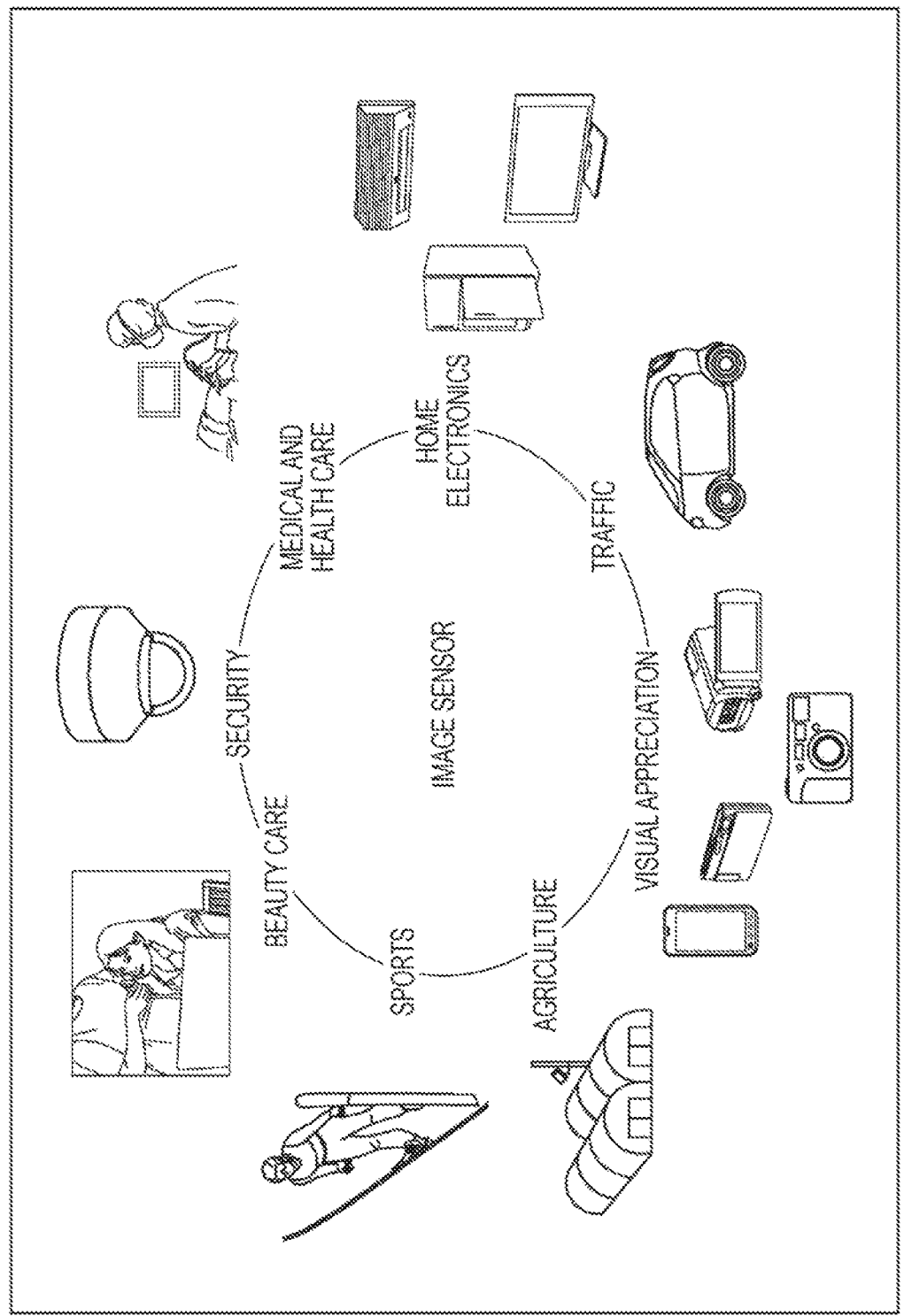
FIG. 8 is a diagram illustrating a use example in which the image sensor is used.

FIG. 8 is a diagram illustrating a use example in which the above-described image sensor is used.

The above-described image sensor can be used in, for example, various electronic devices configured to sense light such as visible light, infrared light, ultraviolet light, X-ray, or the like as described below.

Electronic devices, such as a digital camera and a portable instrument having a camera function, configured to capture images for visual appreciation.

Traffic electronic devices such as an on-board sensor configured to perform image capturing of the front and rear sides, circumference, inside, and the like of an automobile for, for example, safety driving such as automatic stopping and recognition of a driver state and the like, a monitoring camera configured to monitor a travelling vehicle or roads, and a distance measurement sensor configured to perform measurement of, for example, the distance between vehicles.

Electronic devices configured to capture an image of a user gesture to perform an instrument operation in accordance with the gesture and provided to home electronics such as a TV, a refrigerator, and an air conditioner.

Medical and healthcare electronic devices such as an endoscope, and a device configured to perform blood vessel image capturing by receiving infrared light.

Security electronic devices such as an anti-crime monitoring camera and a personal authentication camera.

Beauty care electronic devices such as a skin measurement device configured to capture an image of skin and a micro scope configured to capture an image of scalp.

Sport electronic devices such as an action camera and a wearable camera for sport usage and the like.

Agricultural electronic devices such as a camera for monitoring the states of fields and crops.

<Exemplary Application to Endoscope Operation System>

The technology (present technology) according to the present disclosure is applicable to various products. For example, the technology according to the present disclosure may be applied to an endoscope operation system.

Figure 9:
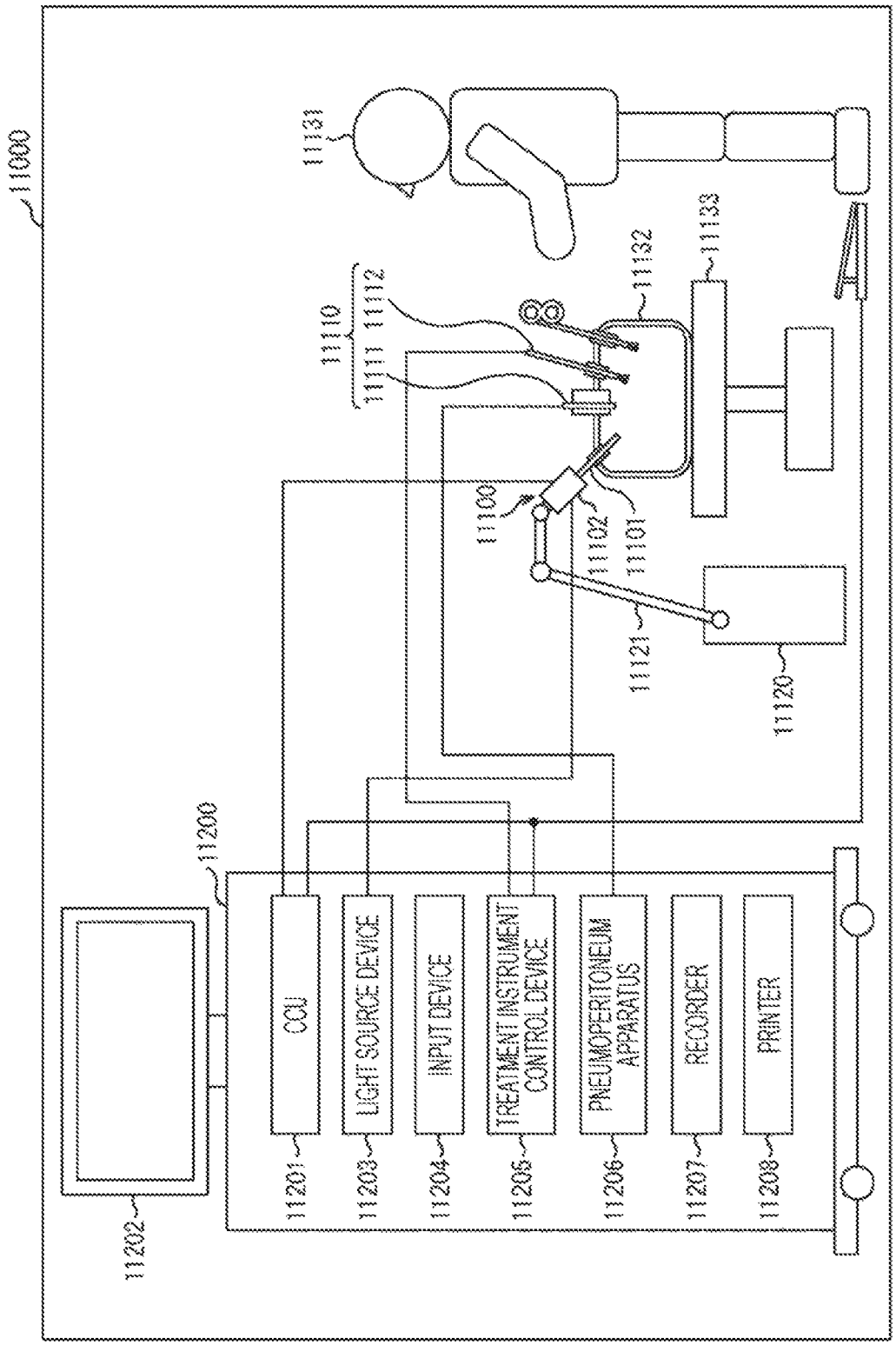
FIG. 9 is a diagram illustrating an exemplary schematic configuration of an endoscope operation system.

FIG. 9 is a diagram illustrating an exemplary schematic configuration of an endoscope operation system to which the technology (present technology) according to the present disclosure is applicable.

FIG. 9 illustrates a situation in which an operator (doctor) 11131 is performing an operation on a patient 11132 on a patient bed 11133 by using an endoscope operation system 11000. As illustrated in the drawing, the endoscope operation system 11000 includes an endoscope 11100, other operation instruments 11110 such as a pneumoperitoneum tube 11111 and an energy treatment instrument 11112, a support arm device 11120 supporting the endoscope 11100, and a cart 11200 on which various devices for an endoscopic operation are mounted.

The endoscope 11100 includes a lens barrel 11101, a region of which extending from a leading end by a predetermined length is inserted into the body cavity of the patient 11132, and a camera head 11102 connected with a base end of the lens barrel 11101. In the illustrated example, the endoscope 11100 is what is called a rigid scope including the rigid lens barrel 11101, but the endoscope 11100 may be what is called a flexible scope including a flexible lens barrel.

The leading end of the lens barrel 11101 is provided with an opening to which an objective lens is fitted. The endoscope 11100 is connected with a light source device 11203, and light generated by the light source device 11203 is guided to the leading end of the lens barrel by a light guide extending inside the lens barrel 11101, and emitted toward an observation target in the body cavity of the patient 11132 through the objective lens. Note that the endoscope 11100 may be a direct-view scope, an oblique view scope, or a side view scope.

An optical system and an image capturing element are provided inside the camera head 11102, and reflected light (observation light) from the observation target is condensed onto the image capturing element through the optical system. The image capturing element photoelectrically converts the observation light, and generates an electric signal corresponding to the observation light, in other words, an image signal corresponding to an observation image. This image signal is transmitted to a camera control unit (CCU) 11201 as RAW data.

The CCU 11201 is achieved by, for example, a central processing unit (CPU) or a graphics processing unit (GPU), and controls overall operation of the endoscope 11100 and a display device 11202. Moreover, the CCU 11201 receives an image signal from the camera head 11102, and provides, to the image signal, various kinds of image processing such as development processing (demosaic processing) for displaying an image based on the image signal.

The display device 11202 displays, under control of the CCU 11201, an image based on the image signal subjected to the image processing by the CCU 11201.

The light source device 11203 is achieved by a light source such as a light emitting diode (LED), and supplies, to the endoscope 11100, irradiation light at image capturing of, for example, an operation site.

An input device 11204 is an input interface for the endoscope operation system 11000. A user can input various kinds of information and instructions to the endoscope operation system 11000 through the input device 11204. For example, the user inputs an instruction or the like to change a condition (for example, the kind of irradiation light, the magnification, or the focal length) of image capturing by the endoscope 11100.

A treatment instrument control device 11205 controls drive of the energy treatment instrument 11112 for, for example, tissue cauterization, incision, or blood vessel sealing. To obtain the visual field of the endoscope 11100 and a work space for an operator, a pneumoperitoneum apparatus 11206 feeds gas into the body cavity of the patient 11132 through the pneumoperitoneum tube 11111 to expand the body cavity. A recorder 11207 is a device capable of recording various kinds of information related to operations. A printer 11208 is a device capable of printing various kinds of information related to operations in various formats of text, image, graph, and the like.

Note that the light source device 11203 configured to supply irradiation light to the endoscope 11100 at image capturing of an operation site may be a white light source achieved by, for example, an LED, a laser beam source, or a combination thereof. In a case where the white light source is achieved by a combination of RGB laser beam sources, the output intensity and output timing of each color (each wavelength) can be highly accurately controlled, and thus the light source device 11203 can adjust the white balance of a captured image. Furthermore, in this case, an image corresponding to each of RGB can be captured in a time divisional manner by irradiating an observation target with laser beams from the respective RGB laser beam sources in a time divisional manner and controlling drive of the image capturing element of the camera head 11102 in synchronization with the timing of the irradiation. According to this method, a color image can be obtained without a color filter provided to the image capturing element.

Furthermore, drive of the light source device 11203 may be controlled to change the intensity of output light in each predetermined time. A high dynamic range image without what is called a black defect and overexposure can be generated by controlling drive of the image capturing element of the camera head 11102 in synchronization with the timing of change of the light intensity to acquire images in a time divisional manner and synthesizing the images.

Furthermore, the light source device 11203 may be capable of supplying light in a predetermined wavelength band corresponding to special light observation. The special light observation involves, for example, what is called narrow band light observation (narrow band imaging) that performs image capturing of a predetermined tissue such as a blood vessel in a mucous membrane surface layer at high contrast by emitting light in a band narrower than that of irradiation light (in other words, white light) at normal observation by utilizing the wavelength dependency of light absorption at a body tissue. Alternatively, the special light observation may involve fluorescence observation that obtains an image through fluorescence caused by excitation light irradiation. In the fluorescence observation, for example, fluorescence from a body tissue can be observed by irradiating the body tissue with excitation light (autofluorescence observation), or a fluorescent image can be obtained by locally injecting a reagent such as indocyanine green (ICG) into a body tissue and irradiating the body tissue with excitation light corresponding to the fluorescence wavelength of the reagent. The light source device 11203 may be capable of supplying narrow band light and/or excitation light corresponding to such special light observation.

Figure 10:
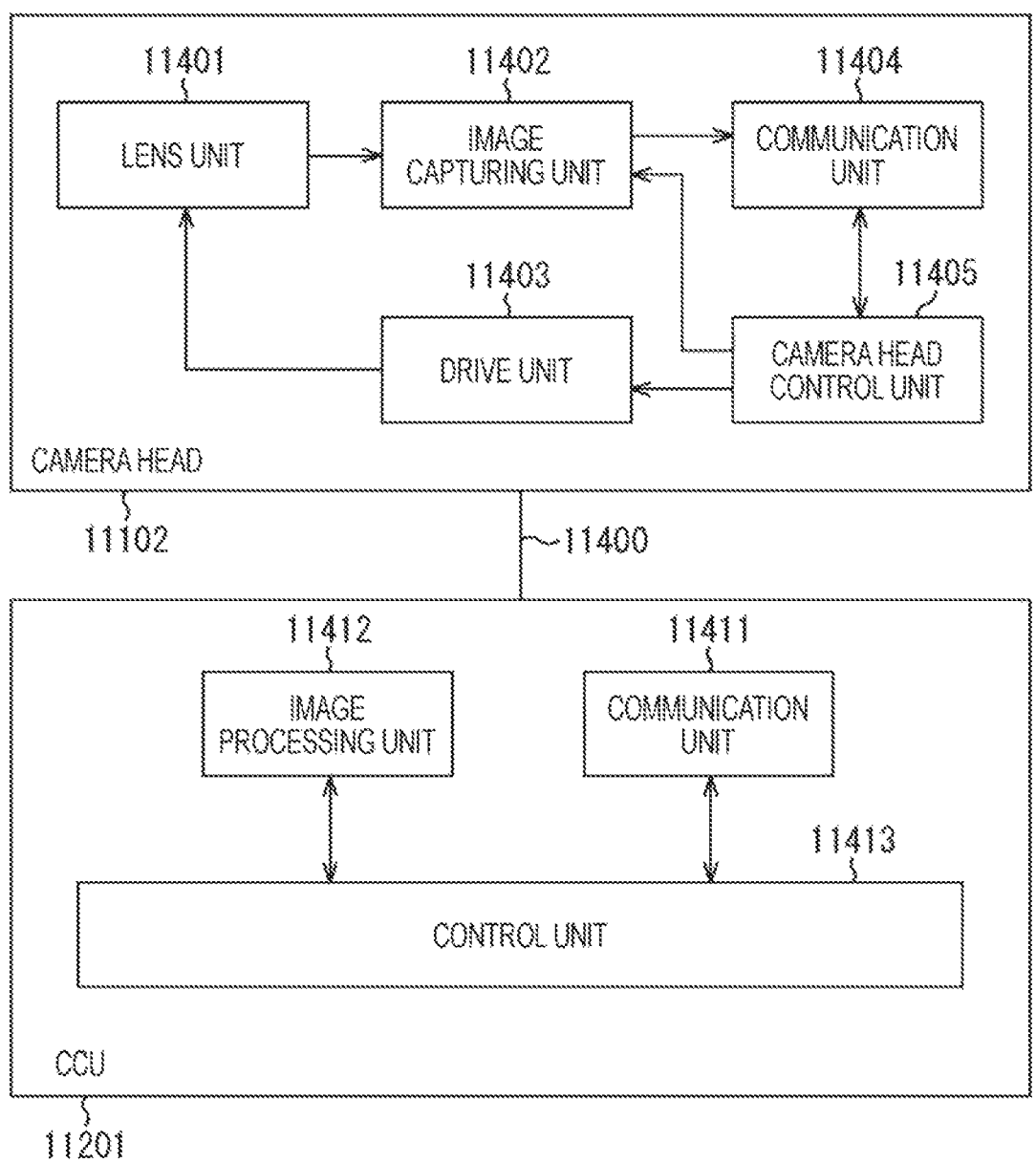
FIG. 10 is a block diagram illustrating an exemplary functional configuration of a camera head and a CCU.

FIG. 10 is a block diagram illustrating exemplary functional configurations of the camera head 11102 and the CCU 11201 illustrated in FIG. 9.

The camera head 11102 includes a lens unit 11401, an image capturing unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected with each other through a transmission cable 11400 to perform communication therebetween.

The lens unit 11401 is an optical system provided at a connection part with the lens barrel 11101. Observation light acquired from the leading end of the lens barrel 11101 is guided to the camera head 11102 and incident on the lens unit 11401. The lens unit 11401 is achieved by a combination of a plurality of lenses including a zoom lens and a focus lens.

The image capturing unit 11402 may include one image capturing element (what is called a single-plate type) or a plurality of image capturing elements (what is called a multi-plate type). In a case where the image capturing unit 11402 is of the multi-plate type, for example, image signals corresponding to RGB, respectively, are generated by the image capturing elements and synthesized to obtain a color image. Alternatively, the image capturing unit 11402 may include a pair of image capturing elements for acquiring image signals for right and left eyes, respectively, to achieve 3D (dimensional) display. When 3D display is performed, the operator 11131 can more accurately recognize the depth of a living body tissue at an operation site. Note that, in a case where the image capturing unit 11402 is of the multi-plate type, a plurality of systems of lens units 11401 may be provided for the respective image capturing elements.

Furthermore, the image capturing unit 11402 does not necessarily need to be provided to the camera head 11102. For example, the image capturing unit 11402 may be provided right after the objective lens inside the lens barrel 11101.

The drive unit 11403 is achieved by an actuator and moves, under control of the camera head control unit 11405, each of the zoom lens and the focus lens of the lens unit 11401 by a predetermined distance in the optical axis. Accordingly, the magnification and focal position of an image captured by the image capturing unit 11402 can be adjusted as appropriate.

The communication unit 11404 is achieved by a communication device for communicating various kinds of information with the CCU 11201. The communication unit 11404 transmits an image signal acquired from the image capturing unit 11402 to the CCU 11201 through the transmission cable 11400 as RAW data.

Furthermore, the communication unit 11404 receives, from the CCU 11201, a control signal for controlling drive of the camera head 11102, and supplies the control signal to the camera head control unit 11405. The control signal includes information associated with image capturing conditions such as information for specifying the frame rate of the captured image, information for specifying the exposure value at image capturing, and/or information specifying the magnification and focal position of the captured image.

Note that the above-described image capturing conditions such as the frame rate, the exposure value, the magnification, and the focal position may be specified by the user as appropriate or automatically set by the control unit 11413 of the CCU 11201 on the basis of an acquired image signal. In the latter case, the endoscope 11100 has what is called an auto exposure (AE) function, an auto focus (AF) function, and an auto white balance (AWB) function.

The camera head control unit 11405 controls drive of the camera head 11102 on the basis of a control signal received from the CCU 11201 through the communication unit 11404.

The communication unit 11411 is achieved by a communication device for communicating various kinds of information with the camera head 11102. The communication unit 11411 receives an image signal transmitted from the camera head 11102 through the transmission cable 11400.

Furthermore, the communication unit 11411 transmits, to the camera head 11102, a control signal for controlling drive of the camera head 11102. Image signals and control signals can be transmitted by, for example, electric communication and optical communication.

The image processing unit 11412 provides various kinds of image processing to an image signal as RAW data transmitted from the camera head 11102.

The control unit 11413 performs various kinds of control related to image capturing of an operation site or the like by the endoscope 11100 and display of a captured image obtained by the image capturing of the operation site or the like. For example, the control unit 11413 generates a control signal for controlling drive of the camera head 11102.

Furthermore, the control unit 11413 displays, on the display device 11202, a captured image including an operation site or the like on the basis of an image signal subjected to image processing by the image processing unit 11412. In this case, the control unit 11413 may recognize various objects in the captured image by using various image recognition technologies. For example, the control unit 11413 can recognize, for example, an operation instrument such as forceps, a particular living body site, bleeding, or mist at use of the energy treatment instrument 11112 by detecting, for example, the shape or color of an edge of an object included in the captured image. In displaying the captured image on the display device 11202, the control unit 11413 may use a result of the recognition to display various kinds of operation support information on an image of the operation site in a superimposing manner. When the operation support information is displayed in a superimposing manner and presented to the operator 11131, a load on the operator 11131 can be reduced, and the operator 11131 can reliably perform the operation.

The transmission cable 11400 connecting the camera head 11102 and the CCU 11201 is an electric signal cable compatible with electric signal communication, an optical fiber compatible with optical communication, or a composite cable thereof.

In the illustrated example, wired communication is performed through the transmission cable 11400, but communication between the camera head 11102 and the CCU 11201 may be performed in a wireless manner.

The above describes an exemplary endoscope operation system to which the technology according to the present disclosure is applicable. The technology according to the present disclosure is applicable to the image capturing unit 11402 in the above-described configuration. Specifically, in operation mode switching at the image capturing unit 11402, the operation mode can be switched at a faster speed by electrically discharging in accordance with a discharge pulse described above.

Note that the above describes an example of an endoscope operation system, but the technology according to the present disclosure is applicable to, for example, a microscope operation system.

<Exemplary Application to Moving Object>

The technology (present technology) according to the present disclosure is applicable to various products. For example, the technology according to the present disclosure may be achieved as a device mounted on any kind of moving object such as an automobile, an electric vehicle, a hybrid electric vehicle, an automatic two-wheel vehicle, a bicycle, a personal mobility, an airplane, a drone, a ship, or a robot.

Figure 11:
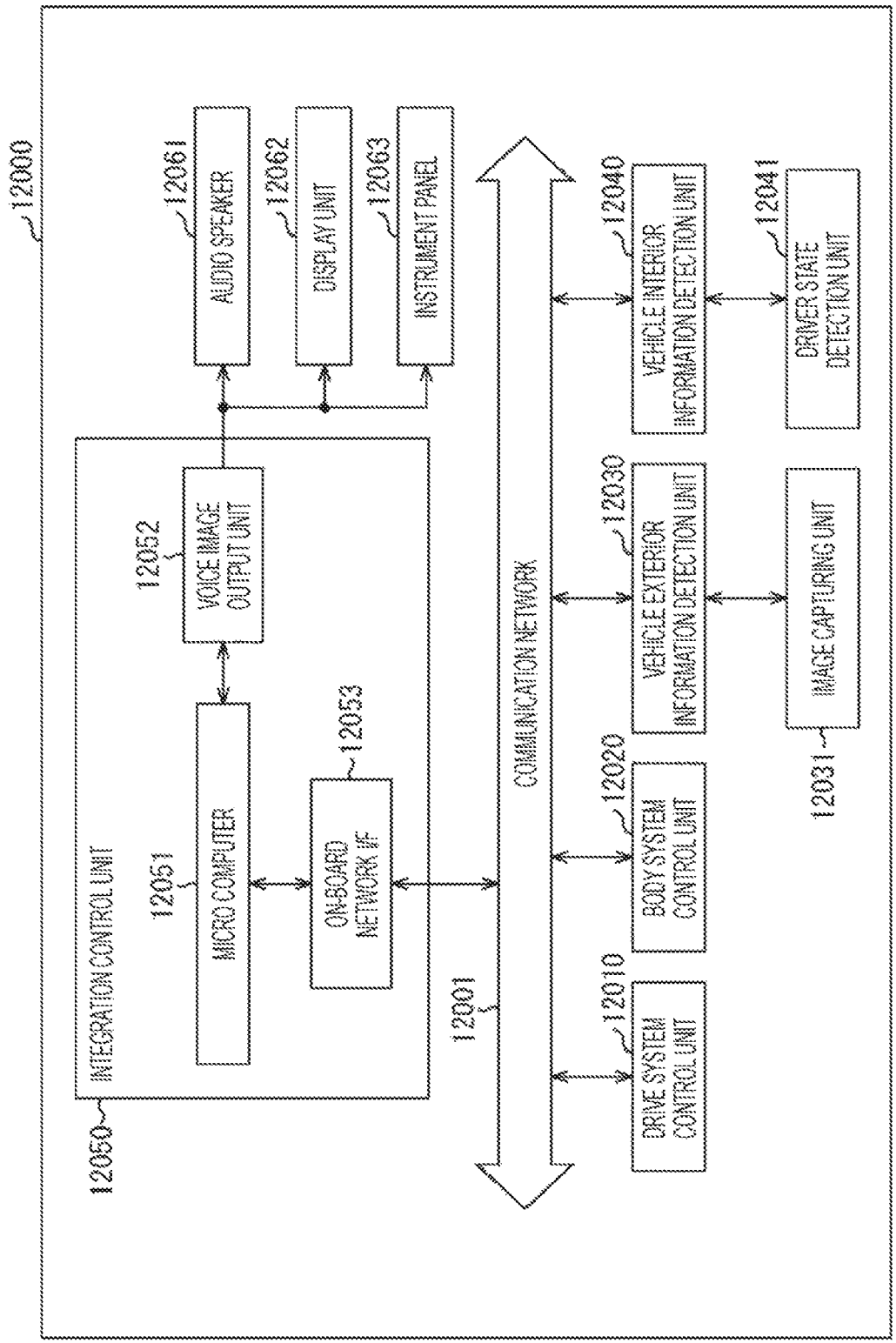
FIG. 11 is a block diagram illustrating an exemplary schematic configuration of a vehicle control system.

FIG. 11 is a block diagram illustrating an exemplary schematic configuration of a vehicle control system as an exemplary moving object control system to which the technology according to the present disclosure is applicable.

A vehicle control system 12000 includes a plurality of electronic control units connected with each other through a communication network 12001. In the example illustrated in FIG. 11, the vehicle control system 12000 includes a drive system control unit 12010, a body system control unit 12020, a vehicle exterior information detection unit 12030, a vehicle interior information detection unit 12040, and an integration control unit 12050. Furthermore, a micro computer 12051, a voice image output unit 12052, and an on-board network interface (I/F) 12053 are illustrated as functional components of the integration control unit 12050.

The drive system control unit 12010 controls device operations related to the drive system of a vehicle in accordance with various computer programs. For example, the drive system control unit 12010 functions as a control device of, for example, a drive power generation device such as an internal combustion or a drive motor configured to generate drive power of the vehicle, a drive power transmission mechanism configured to transfer the drive power to wheels, a steering mechanism configured to adjust the angle of the vehicle, and a braking device configured to generate braking force of the vehicle.

The body system control unit 12020 controls operations of various devices mounted on the vehicle body in accordance with various computer programs. For example, the body system control unit 12020 functions as a control device of a keyless entry system, a smart key system, a power window device, and various lamps such as a head lamp, a rear lamp, a brake lamp, an indicator, and a fog lamp. In this case, the body system control unit 12020 may receive radio wave emitted by a portable device as an alternative key or various switch signals. The body system control unit 12020 receives inputting of the radio wave or signals and controls a door lock device, a power window device, a lamp of the vehicle, and the like.

The vehicle exterior information detection unit 12030 detects information on the outside of the vehicle on which the vehicle control system 12000 is mounted. For example, the vehicle exterior information detection unit 12030 is connected with an image capturing unit 12031. The vehicle exterior information detection unit 12030 causes the image capturing unit 12031 to capture an image of the outside, and receives the captured image. The vehicle exterior information detection unit 12030 may perform, on the basis of the received image, object detection processing or distance detection processing for, for example, a person, a vehicle, an obstacle, a sign, or a character on a road surface.

The image capturing unit 12031 is a light sensor configured to receive light and output an electric signal in accordance with the received amount of the light. The image capturing unit 12031 may output the electric signal as an image or as distance measurement information. Furthermore, the light received by the image capturing unit 12031 may be visible light or invisible light such as infrared.

The vehicle interior information detection unit 12040 detects information on the inside of the vehicle. The vehicle interior information detection unit 12040 is connected with, for example, a driver state detection unit 12041 configured to detect the state of the driver. The driver state detection unit 12041 includes, for example, a camera configured to capture an image of the driver, and the vehicle interior information detection unit 12040 may calculate the fatigue degree or concentration degree of the driver on the basis of detection information input from the driver state detection unit 12041 or may determine whether or not the driver is asleep.

The micro computer 12051 may calculate a control target value of the drive power generation device, the steering mechanism, or the braking device on the basis of the outside or vehicle interior information acquired by the vehicle exterior information detection unit 12030 or the vehicle interior information detection unit 12040, and output a control command to the drive system control unit 12010. For example, the micro computer 12051 can perform coordination control to achieve functions of an advanced driver assistance system (ADAS) such as avoidance or impact reduction of vehicle collision, following travel, vehicle speed maintaining travel, and vehicle collision warning based on the inter-vehicle distance, and vehicle lane deviation warning.

Furthermore, the micro computer 12051 can perform coordination control to achieve, for example, an automatic driving for automatic traveling independently from an operation by the driver by controlling, for example, the drive power generation device, the steering mechanism, or the braking device on the basis of information on the surrounding of the vehicle acquired by the vehicle exterior information detection unit 12030 or the vehicle interior information detection unit 12040.

Furthermore, the micro computer 12051 can output a control command to the body system control unit 12020 on the basis of the vehicle exterior information acquired by the vehicle exterior information detection unit 12030. For example, the micro computer 12051 can control the head lamp in accordance with the position of a preceding vehicle or an oncoming vehicle detected by the vehicle exterior information detection unit 12030, thereby performing coordination control to achieve an antidazzle operation such as switching from a high beam to a low beam.

The voice image output unit 12052 transmits an output signal of at least one of voice or an image to an output device capable of notifying information to a person on board or the outside of the vehicle in a visual or auditory manner. In the example illustrated in FIG. 11, the output device is an audio speaker 12061, a display unit 12062, and an instrument panel 12063. The display unit 12062 may include, for example, at least one of an on-board display or a head-up display.

Figure 12:
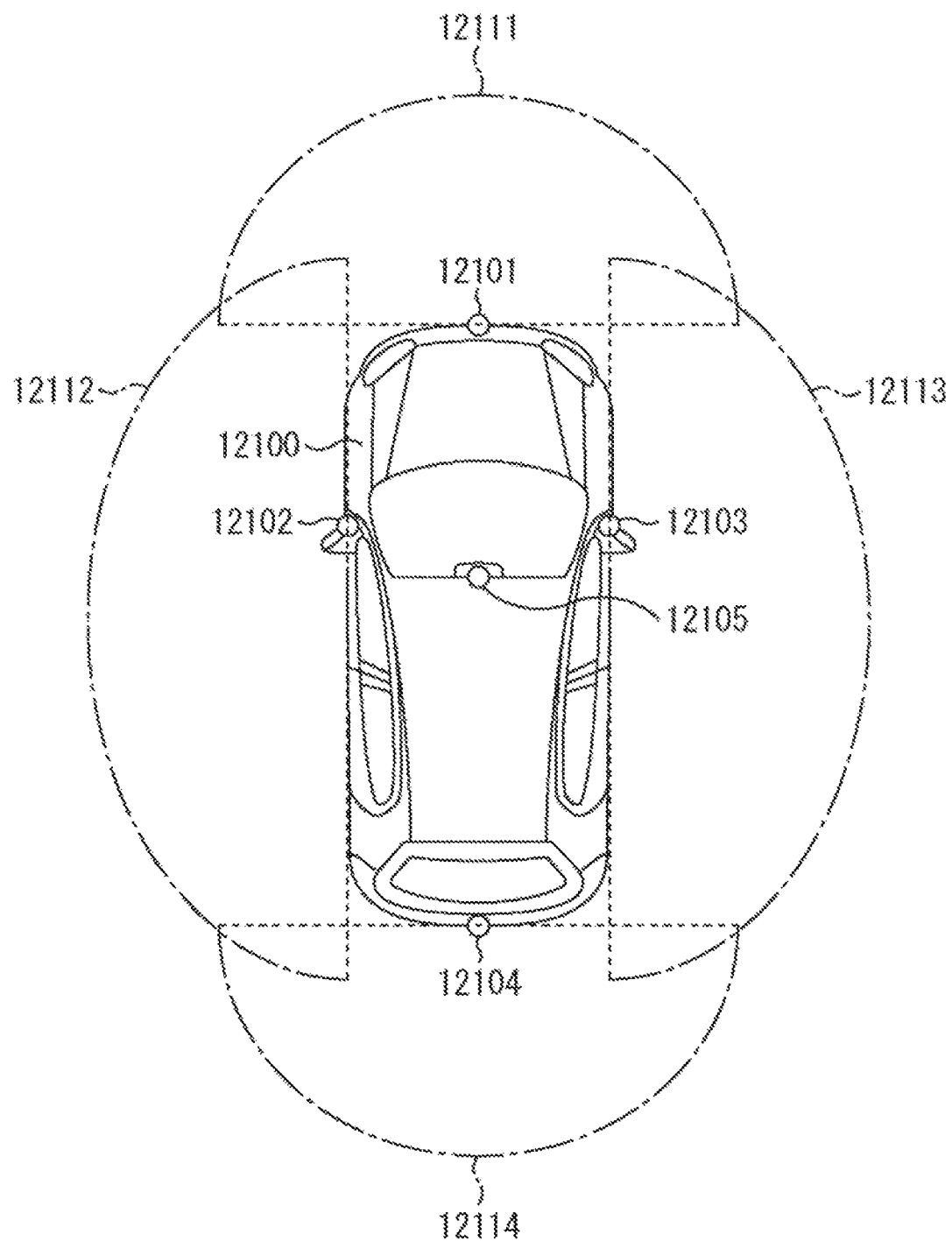
FIG. 12 is an explanatory diagram illustrating exemplary installation positions of a vehicle exterior information detection unit and an image capturing unit.

FIG. 12 is a diagram illustrating an exemplary installation position of the image capturing unit 12031.

In FIG. 12, image capturing units 12101, 12102, 12103, 12104, and 12105 are provided as the image capturing unit 12031.

The image capturing units 12101, 12102, 12103, 12104, and 12105 are provided at, for example, the positions of the front nose, the side mirrors, the rear bumper, the backdoor, and an upper part of the front glass inside the vehicle of a vehicle 12100. The image capturing unit 12101 provided to the front nose and the image capturing unit 12105 provided to the upper part of the front glass inside the vehicle mainly acquire images on the front side of the vehicle 12100. The image capturing units 12102 and 12103 provided to the side mirrors mainly acquire images on sides of the vehicle 12100. The image capturing unit 12104 provided to the rear bumper or the backdoor mainly acquires an image on the back side of the vehicle 12100. The image capturing unit 12105 provided to the upper part of the front glass inside the vehicle is mainly used detect, for example, a preceding vehicle, a pedestrian, an obstacle, a traffic light, a traffic sign, and a lane.

Note that FIG. 12 illustrates exemplary image capturing ranges of the image capturing units 12101 to 12104. An image capturing range 12111 indicates the image capturing range of the image capturing unit 12101 provided to the front nose, image capturing ranges 12112 and 12113 indicate the image capturing ranges of the image capturing units 12102 and 12103 provided to the side mirrors, respectively, and an image capturing range 12114 indicates the image capturing range of the image capturing unit 12104 provided to the rear bumper or the backdoor. For example, image data captured by the image capturing units 12101 to 12104 is placed over to obtain a panoramic image of the vehicle 12100 when viewed from above.

At least one of the image capturing units 12101 to 12104 may have a function to acquire distance information. For example, at least one of the image capturing units 12101 to 12104 may be a stereo camera including a plurality of image capturing elements, or may be an image capturing element including pixels for phase difference detection.

For example, the micro computer 12051 can calculate the distance to each solid object in the image capturing ranges 12111 to 12114 and temporal change of the distance (speed relative to the vehicle 12100) on the basis of distance information obtained from the image capturing units 12101 to 12104, thereby extracting, as a preceding vehicle, in particular, a solid object positioned nearest on the travelling lane of the vehicle 12100 and traveling at a predetermined speed (for example, 0 km/h or higher) in a direction substantially same as that of the vehicle 12100. Moreover, the micro computer 12051 can set, behind the preceding vehicle, an inter-vehicle distance to be held in advance and perform, for example, automatic brake control (including following stop control) and automatic acceleration control (including following start control). In this manner, coordination control can be performed to achieve, for example, automatic driving for automatic traveling independently from an operation by the driver.

For example, the micro computer 12051 can classify solid object data related to a solid object into a two-wheel vehicle, a standard-size vehicle, a large-size vehicle, a pedestrian, a utility pole, another solid object, and the like on the basis of distance information obtained from the image capturing units 12101 to 12104, extract the solid object data, and use the solid object data for obstacle automatic avoidance. For example, the micro computer 12051 identifies each obstacle around the vehicle 12100 as an obstacle that can be visually recognized by the driver of the vehicle 12100 or an obstacle that cannot be visually recognized. Then, the micro computer 12051 determines a collision risk indicating the potential of collision with the obstacle, and in a case where the collision risk is equal to or higher than a set value and collision is likely to occur, the micro computer 12051 can perform operation support to avoid collision by outputting an alert to the driver through the audio speaker 12061 and the display unit 12062 or performing forced deceleration or evasive steering through the drive system control unit 12010.

At least one of the image capturing units 12101 to 12104 may be an infrared camera configured to detect infrared. For example, the micro computer 12051 determines whether or not a pedestrian is included in an image captured by at least one of the image capturing units 12101 to 12104, thereby recognizing the pedestrian. Such pedestrian recognition is performed through, for example, the procedure of extracting a feature point in the image captured by at least one of the image capturing units 12101 to 12104 as an infrared camera, and the procedure of performing pattern matching processing on a series of feature points indicating the outline of an object to determine whether or not a pedestrian is included. When the micro computer 12051 determines that a pedestrian is included in the image captured by at least one of the image capturing units 12101 to 12104, and recognizes the pedestrian, the voice image output unit 12052 controls the display unit 12062 to display a square outline line on the recognized pedestrian in a superimposing manner for emphasis. Furthermore, the voice image output unit 12052 may control the display unit 12062 to display, at a desired position, an icon or the like indicating the pedestrian.

The above describes an exemplary vehicle control system to which the technology according to the present disclosure is applicable. The technology according to the present disclosure is applicable to the image capturing units 12101 to 12104 in the above-described configuration. Specifically, in the operation mode switching at the image capturing units 12101 to 12104, the operation mode can be switched at a faster speed by electrically discharging in accordance with the discharge pulse described above.

Note that the present technology may be configured as described below.

(1)

An image capturing element including:

a pixel region in which a plurality of pixels are disposed in a matrix of rows and columns; and a vertical drive circuit configured to drive the pixels on each row, in which the vertical drive circuit includes a power source configured to supply electrical power to an output element configured to output a drive signal for driving each pixel, and a control element configured to control current flowing between a wire through which electrical power is output from the power source and a ground level in accordance with a pulse having a predetermined pulse width at the operation mode switching.

(2)

The image capturing element according to (1), in which the control element is a resistor and a switch connecting the wire through which electrical power is output from the power source and the ground level in series, and the switch opens and closes in accordance with the pulse.

(3)

The image capturing element according to (2), in which the vertical drive circuit further includes a power source side resistor and a power source side switch connecting the wire through which electrical power is output from the power source and a predetermined power voltage in series.

(4)

The image capturing element according to (2) or (3), in which a positive power source configured to supply the positive voltage to the output element, and a negative power source configured to supply the negative voltage to the output element are provided as the power source, and the vertical drive circuit includes, as the switch, a first switch connecting a wire through which electrical power is output from the positive power source and the ground level, and a second switch connecting a wire through which electrical power is output from the negative power source and the ground level.

(5)

The image capturing element according to (1), in which the control element is a current source connecting, in series, the wire through which electrical power is output from the power source and the ground level, and the current source generates current in accordance with the pulse.

(6)

A method of driving an image capturing element including a pixel region in which a plurality of pixels are disposed in a matrix of rows and columns, and a vertical drive circuit configured to drive the pixels on each row, the method controlling current flowing between a wire through which electrical power is output from a power source configured to supply electrical power to an output element configured to output a drive signal for driving each pixel and a ground level in accordance with a pulse having a predetermined pulse width at the operation mode switching.

(7)

An electronic device including an image capturing element including
a pixel region in which a plurality of pixels are disposed in a matrix of rows and columns; and
a vertical drive circuit configured to drive the pixels on each row,
in which the vertical drive circuit includes:
a power source configured to supply electrical power to an output element configured to output a drive signal for driving each pixel; and
a control element configured to control current flowing between a wire through which electrical power is output from the power source and a ground level in accordance with a pulse having a predetermined pulse width at the operation mode switching.

Note that the embodiments of the present technology are not limited to the above-described embodiments, and various modifications are possible without departing from the gist of the present technology.

REFERENCE SIGNS LIST

11 Image sensor
12 Pixel region
13 Vertical drive circuit
14 Column signal processing circuit
15 Horizontal drive circuit
16 Output circuit
17 Ramp signal generation circuit
18 Control circuit
21 Pixel
22 Horizontal signal line
23 Vertical signal line
24 Data output signal line
31 PD
32 Forwarding transistor
33 FD unit
34 Amplification transistor
35 Selection transistor
36 Reset transistor
41 Positive power source
42 Negative power source
43-1, 43-2 Resistance
44-1, 44-2 Switch
45-1, 45-2 Capacitor
46-1 to 46-3 Output element
47-1, 47-2 Current source
51 Load MOS
52-1, 52-2 Capacitor
53 Comparator
54 Capacitor
61 DAC
62 Ramp resistor

The invention claimed is:

1. An image capturing element, comprising:
a pixel region including a plurality of pixels in a matrix of rows and columns; and
a vertical drive circuit configured to:
receive a pulse from a control circuit; and
drive pixels on each row based on the pulse, wherein
a pulse width of the pulse in an operation mode switching is based on a first voltage value of the image capturing element before the operation mode switching and a second voltage value of the image capturing element to be set after the operation mode switching, and
the vertical drive circuit includes:
a power source configured to supply electrical power to an output element, wherein the output element is configured to output a drive signal for driving each pixel of the plurality of pixels; and
a control element configured to control current flowing between a wire through which the electrical power is output from the power source and a ground level based on the pulse having the pulse width at the operation mode switching.

2. The image capturing element according to claim 1, wherein the control element includes:
a resistor; and
a switch configured to:
connect the wire through which the electrical power is output from the power source and the ground level in series; and
open and close based on the pulse.

3. The image capturing element according to claim 2, wherein the vertical drive circuit further includes:
a power source side resistor; and
a power source side switch configured to connect the wire through which the electrical power is output from the power source and a power voltage in series.

4. The image capturing element according to claim 2, wherein
the power source includes:
a positive power source configured to supply positive voltage to the output element; and
a negative power source configured to supply negative voltage to the output element, and
the vertical drive circuit further includes:
a first switch configured to connect a wire through which the electrical power is output from the positive power source and the ground level, and
a second switch configured to connect a wire through which the electrical power is output from the negative power source and the ground level.

5. The image capturing element according to claim 1, wherein
the control element includes a current source, and
the current source is configured to:
connect in series, the wire through which the electrical power is output from the power source and the ground level; and
generate current based on the pulse.

6. A method of driving an image capturing element, the method comprising:
receiving, by a vertical drive circuit, a pulse from a control circuit;
driving, by the vertical drive circuit, pixels on each row of a matrix of rows and columns based on the pulse, wherein
a plurality of pixels is in the matrix of the rows and the columns, and
a pulse width of the pulse in an operation mode switching is based on a first voltage value of the image capturing element before the operation mode switching and a second voltage value of the image capturing element to be set after the operation mode switching; and
controlling current flowing between a wire through which electrical power is output from a power source and a ground level based on the pulse having the pulse width at the operation mode switching, wherein
the power source is configured to supply electrical power to an output element, and
the output element is configured to output a drive signal for driving each pixel of the plurality of pixels.

7. An electronic device, comprising:
an image capturing element including:
- a pixel region including a plurality of pixels in a matrix of rows and columns; and
- a vertical drive circuit configured to:
  - receive a pulse from a control circuit; and
  - drive pixels on each row based on the pulse, wherein
    - a pulse width of the pulse in an operation mode switching is based on a first voltage value of the image capturing element before the operation mode switching and a second voltage value of the image capturing element to be set after the operation mode switching, and
  - the vertical drive circuit includes:
    - a power source configured to supply electrical power to an output element, wherein the output element is configured to output a drive signal for driving each pixel of the plurality of pixels; and
    - a control element configured to control current flowing between a wire through which the electrical power is output from the power source and a ground level based on the pulse having the pulse width at the operation mode switching.

8. An image capturing element, comprising:
a pixel region including a plurality of pixels in a matrix of rows and columns; and
a vertical drive circuit configured to drive pixels on each row, wherein
the vertical drive circuit includes:
- a power source configured to supply electrical power to an output element, wherein
  the power source includes:
  - a positive power source configured to supply positive voltage to the output element; and
  - a negative power source configured to supply negative voltage to the output element, and
  the output element is configured to output a drive signal for driving each pixel; and
- a control element configured to control current flowing between a wire through which the electrical power is output from the power source and a ground level based on a pulse having a determined pulse width at operation mode switching, wherein
  the control element includes:
  - a resistor;
  - a first switch configured to connect the wire through which the electrical power is output from the positive power source and the ground level in series; and
  - a second switch configured to connect the wire through which the electrical power is output from the negative power source and the ground level in series,
  wherein the first switch and the second switch are configured to open and close based on the pulse.

* * * * *